Patented Jan. 14, 1947

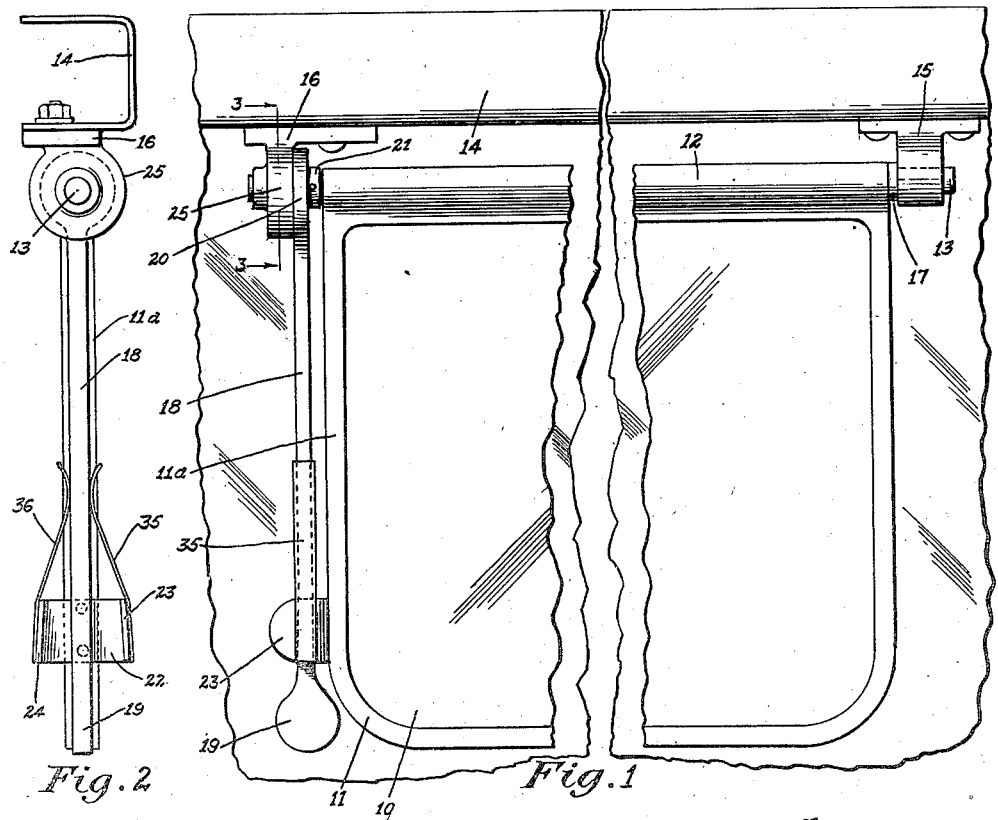
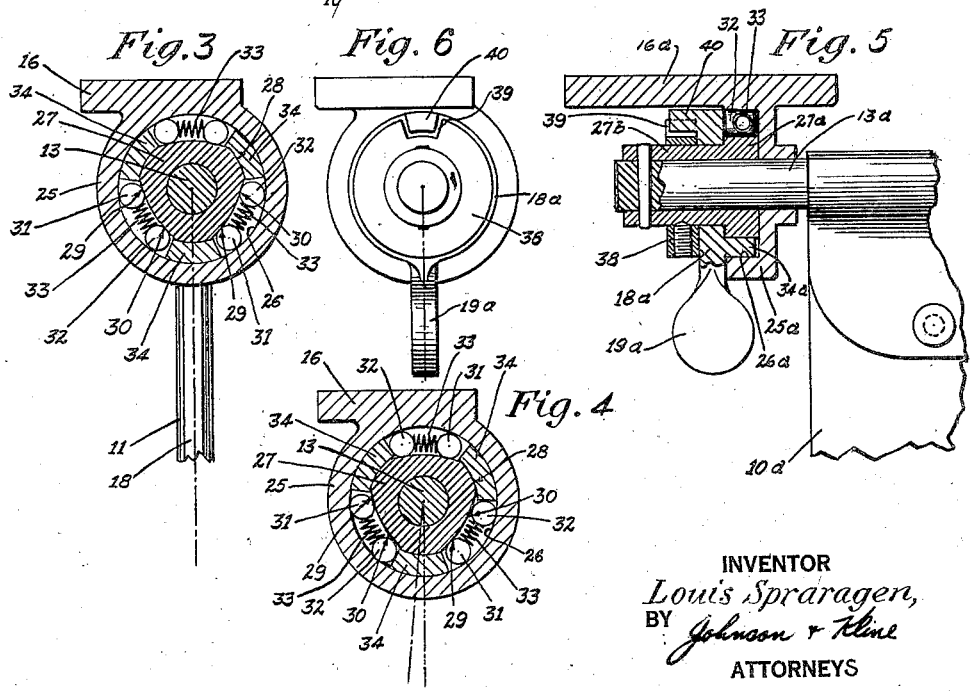

2,414,340

UNITED STATES PATENT OFFICE 2,414,340

ANTIGLARE SHIELD FOR VEHICLES

Louis Spraragen, Bridgeport, Conn., assignor to Automatic Locking Devices, Incorporated, Bridgeport, Conn., a corporation of Connecticut Application January 15, 1944, Serial No. 518,322

19 Claims. (Cl. 296—97)

This invention relates to anti-glare shields for use on vehicles.

Such shields are commonly used in pleasure cars, busses and the like, and are mounted so as to be swung on a horizontal axis from an out-of-the-way position to a position of use, more or less parallel with the windshield when protection is wanted against glare, etc.

The shields comprise a panel of light-modifying material such as opaque colored or polarized glass, and when used in busses and trucks are rather large and heavy. They are subjected to vibrations and jarring incident to the travel of the vehicle and frequently they are moved out of adjusted position by such vibration and jarring or by the sudden stopping of the vehicle.

Heretofore, such anti-glare shields have been held in adjusted position frictionally and, while this method of holding them is satisfactory where the shields are of light weight or relatively small, it has not proven sufficient when the shields are large and heavy.

An object of the present invention is to provide means for positively, as opposed to frictionally, locking the glare shield in any desired adjusted position.

This is accomplished by the present invention by the provision of a locking means which locks the shield against movement in both directions and yet which is easily and quickly released, preferably as an incident to the operation of adjusting the shield.

A feature of the present invention is the provision of a locking means for automatically locking the shield in adjusted position with manually operable means for releasing the locking means and by a continued operation moving or aiding in moving the shield to adjusted position, the lock releasing means being movable in advance of and in the same direction as the shield is to be moved.

In one form of the invention where the shield is comparatively light and easily moved, the unlocking means may be in the form of a fingerpiece, the movement of which unlocks the shield and then moves the shield to desired position.

In another form of the invention which is particularly suitable where the shield is quite heavy, the fingerpiece is placed in such relation to the shield that the fingers of the same hand which operates the fingerpiece may also grasp the shield and assist in adjusting it while it remains unlocked by application of force to the fingerpiece.

The anti-glare shield of the present invention is particularly advantageous since, by locking the shield in adjusted position, danger of the anti-glare shield crashing against the windshield when the vehicle is suddenly stopped and being broken or breaking the latter with its resulting possibility of injury to the driver and other occupants of the car is eliminated.

Other features and advantages will hereinafter appear.

In the accompanying drawing:

Figure 1 is a plan view of an improved antiglare or sun shield illustrating one embodiment of the invention.

Fig. 2 is a side elevation of the shield of Fig. 1.

Fig. 3 is a section taken on the line 3—3 of Fig. 1, with the panel locked against movement.

Fig. 4 is a section similar to that of Fig. 3 but with the controlling mechanism for the panel unidirectionally unlocked, as during adjustment of the latter.

Fig. 5 is a fragmentary plan view, partly in section, showing another embodiment of the invention.

Fig. 6 is a detail view in side elevation of the handle and locking mechanism of Fig. 5.

Referring to the embodiment of Figs. 1 and 2, a panel 10 which may be of colored, polarizing, semi-opaque or opaque glass or other material, which I characterize as light-modifying, is carried in a frame 11 having one side 12 thereof enlarged to provide a bore through which a shaft 13 passes for supporting the panel, the latter being fixed to the shaft against relative turning.

For the purpose of mounting the panel 10 for use in a vehicle adjacent the windshield, as on a supporting member 14, there is provided a pair of bearing brackets 15 and 16 fastened to the member 14 with bolts, and which receive the ends of the shaft 13 and permit the panel to be swung with the shaft as an axis (usually horizontal) to various settings. If desired a spacing washer 17, as shown, may be used to compensate for variations in the mounting of the brackets and prevent end-play thereof.

According to the present invention there is provided an improved operating and locking mechanism for the panel 10 to facilitate quick and convenient setting of same in various adjusted positions for use as more or less adjacent the windshield, or in other positions out of use.

In the embodiment of the invention shown in Figs. 1 through 4, this mechanism includes a lever 18 which is adapted to be grasped and moved when it is desired to adjust the panel 10, the lever having for this purpose a fingerpiece 19 at one end. The lever 18 extends along the edge 11a of the frame and has at its other end an enlargement 20 provided with a hub 21 whereby the lever is rotatably mounted on the shaft 13. In order to connect the lever 18 for operating or driving the panel there is provided a substantially U-shaped member 22 which is rigidly fastened to the side 11a of the frame and has ears 23 and 24 extending past each side of the lever for engagement therewith.

As may be seen in Fig. 2, the ears 23 and 24 are spaced apart to provide a predetermined amount of lost motion between same and the lever 18 for purposes which will be described shortly. When the fingerpiece 19 is grasped and the lever moved to adjust the panel 10, this lost motion is first taken up and then as the movement of the lever is continued the latter by engaging one of the ears 23, 24 moves the panel 10 to the desired position and only comparatively light pressure being required due to the distance between the fingerpiece and the shaft.

For the purpose of conveniently unlocking and locking the panel 10, before and after it is adjusted respectively, this invention provides a novel arrangement whereby a selective locking means is operated in response to relative movement between the lever 18 and the panel, as permitted by the lost motion between the ears 23 and 24. Thus by grasping and moving the lever, the double operation of unlocking the panel and moving same to a new position may be performed as a single operation; and the locking of the panel again may automatically take place when the lever is released.

In the form of the invention illustrated herein as exemplary thereof, an automatically operated and manually released locking device is interposed between the panel and the bracket. Accordingly, as shown in Figs. 1, 3 and 4, the bearing bracket 16 is provided with a cylindrical flange 25 having an inner race 26 which is concentric with the shaft 13, the flange and race functioning much in the manner of a brake drum. Fastened to the shaft 13 and located inside the flange 25 is a disk 27 having a cylindrical periphery 28 concentric with the race 26 and spaced therefrom, the periphery being relieved at three equi-spaced areas to provide at each a pair of opposed camming or locking surfaces 29 and 30. Between each pair of locking surfaces 29 and 30 and the race 26 there are located hard locking rollers 31 and 32 respectively, the pairs of rollers being yieldingly urged apart and into engagement with the locking surfaces and race by helical coil springs 33.

As shown in Fig. 3, the rollers 31 and 32 are wedged respectively between the surfaces 29 and 30 and the race 26, thereby effectively locking the disk 27 against rotation relative to the flange 25 and bracket 16. Since the disk 27 is immovable with respect to the panel 10, the latter is thus locked to the bracket 16 and therefore secured against accidental movement from an adjusted position in the vehicle.

For the purpose of unlocking the disk 27 and flange 25, as when it is desired to readjust the panel 10, the enlargement 20 of the lever is provided laterally thereof with a plurality of lugs 34 extending between the cylindrical surfaces 28 of the disk and the race 26. The lugs 34 are located so that when the lever 18 is in its intermediate or centralized position with respect to the U-shaped member 22 of the panel frame, as in Figs. 2 and 3, they do not touch the sets of rollers 31 and 32 locking the panel. However, if the lever 18 is moved, as for the purpose of adjusting the panel 10, before it engages one of the ears 23 or 24 the lugs 34 will dislodge one of the sets of rollers 31 or 32, thereby unlocking the panel for movement in the same direction as the lever. As the lever continues to move it will engage one of the ears 23 or 24 and move the panel with it to the new position.

Fig. 4 shows the position of the lugs 34 when the lever 18 is engaging an ear of the U-shaped member 22. In this figure, the lever and lugs have been rotated clockwise with respect to the centralized position of Figs. 2 and 3, and the set of rollers 32 has been moved out of locking position by the lugs, making possible clockwise rotation of the shaft 13 and panel. Although the set of rollers 31 remain in locking position, they will not interfere with this clockwise rotation, since movement of the parts is such as to oppose their wedging tightly.

In a like manner, moving of the lever 18 in the opposite direction will cause the lugs 34 to release the set of rollers 31, thus permitting movement of the panel 10 also in this opposite direction.

As shown, a pair of leaf springs 35 and 36 are carried by the ears 23 and 24 respectively, to engage the lever 18 and aid in yieldably holding it in centralized or intermediate position between said ears. By locating the springs 35 and 36 near the end of the lever the effect of its moment of inertia is overcome, and it is more reliably damped against being moved by vibrations. Thus, after the panel 10 has been moved to an adjusted position and the lever 18 released from the operator's grasp, the springs 35 and 36 will immediately centralize the lever to the position of Figs. 2 and 3, and the coil springs 33 will move the rollers again into locking position to securely lock the panel 10. The action of the springs 33 in returning the rollers to locking position is such as to also centralize the lever 18 independently of the springs 35 and 36.

It is especially convenient to move the panel 10 to adjusted position by grasping both the fingerpiece 19 and the adjacent corner of the panel 10 at the same time, or by grasping the fingerpiece and one of the ears 23, 24 at the same time. When so doing, the fingerpiece is moved by a slight twist of the fingers against one of the springs 35, 36 to unlock the panel and then both parts are carried along in these relative positions to the new setting. When the parts are released, the lever 18 will centralize and relock the panel.

Another form of the invention is shown in Figs. 5 and 6. In this form, a panel 10a which may be of light weight material is fixed to and carried by a shaft 13a supported in a bearing bracket 16a having a cylindrical locking flange 25a and race 26a. A disk 27a is mounted inside the flange 25a and fastened to the shaft 13a by a hub 27b, the disk having a cylindrical periphery relieved at equidistant areas to provide pairs of opposed camming or locking surfaces. Spring-urged rollers are located between the locking surfaces and the race 26a to lock the disk 27a to the flange 25a, and thereby lock the panel 10a to the bracket 16a.

For the purpose of unlocking and operating the panel 10a a driving member 18a having a fingerpiece 19a is rotatably mounted on the hub 27B, the member 18a having a plurality of lugs 34a adapted to engage and unlock the rollers inside the rack 26a. A driving connection between the member 18a and the hub 27B is provided by a disk 38 fastened to said hub and having a slot 39 which loosely receives a key 40 integral with the member. Normally the driving member 18a is held in a locking position wherein the key 40 is centralized in the slot 39 by the coil springs associated with the locking rollers. When it is desired to move the panel 10a to an adjusted position, the fingerpiece 19a is grasped and the driving member 18a turned slightly in the desired direction. This unlocks the panel, but the latter does not move due to the clearance between the slot 39 and key 40. As the movement of the driving member is continued, the key and slot engage each other and the panel is driven by the member to its desired position. During this movement the panel may be urged along with the fingers, also. When the fingerpiece 19a is released by the operator, the driving member 18a is returned to a centralized position by the coil springs acting on the locking rollers and moving same to locked position, and the panel 10a therefore remains locked against incidental movement.

Variations and modifications may be made within the scope of this invention and portions of the improvements may be used without others.

I claim:

1. An anti-glare shield for motor vehicles comprising a panel of light-modifying material; means including a fixed support and a pivot therein fixedly connected to the panel for mounting the panel adjacent the windshield of the vehicle for pivotal adjustable movement to and from various positions in back of the windshield and to an out-of-the-way position; and means disposed between the pivot and the support including opposed relatively movable wedging members for automatically locking the pivot to the support in any adjusted position to hold the panel in any such adjusted position against casual or unintentional movement.

2. The invention as defined in claim 1 in which there are means for manually releasing said wedging members to permit adjustment of the panel.

3. The invention as defined in claim 1 in which there are means operable on the locking means and panel for first releasing the wedging members and then moving the panel to adjusted position.

4. The invention as defined in claim 1 in which there are means mounted on the first-named means for first releasing the wedging members and then moving the panel to adjusted position either to or from an operative position.

5. The invention as defined in claim 1 in which there are manually movable means operable upon the locking means and panel for releasing the wedging members and shifting the panel to another desired setting with but a single motion.

6. An anti-glare shield for vehicles having a panel mounted for movement rotatively about an axis; a manually operable member movable relatively to the panel between two predetermined limits and connecting positively at said limits with the panel to move therewith; means for locking the panel against accidental movement about its axis when the operable member is in a position intermediate the predetermined limits, said means being operated upon by said member to release the panel upon movement of said member to either of said limits; and means for yieldably holding the operable member in said intermediate position whereby the panel is locked against accidental movement, and whereby it may be released and turned about its axis by moving the member in such direction, the panel being automatically locked in its new position upon release by the operator of the operable member and return of same to its relative intermediate position by said yielding means.

7. An anti-glare shield for vehicles having a panel mounted for movement rotatively about an axis; a manually operable member movable relatively to the panel between two predetermined limits and connecting positively at said limits with the panel to move therewith; means for locking the panel against accidental rotative movement about its axis when the operable member is in a position intermediate the predetermined limits, said means being operated upon by said member and selectively releasing the panel for movement in one or the other direction upon movement of said member toward one or the other of said limits; and means for yieldably holding the operable member in said intermediate position whereby the panel is locked against accidental movement and whereby it may be unlocked and then turned in one of its directions about its axis by first moving the member to the corresponding one of its limits, the panel being automatically locked in its new position upon release by the operator of the operable member and return of same to its intermediate position by said yielding means.

8. A pivotally mounted anti-glare shield for vehicles comprising a panel, a stationary support and a device having two main parts for mounting the panel on the support for movement rotatively about an axis, one of said parts having an annular track portion and the other having a pair of camming surfaces located along the face of the track and spaced therefrom, and located symmetrically with respect to a median line of the latter, one of said parts being attached to said panel and the other to said support; a pair of locking members located one between each camming surface and the track; means for yieldably holding each locking member in engagement with the track and its respective camming surface so that said members wedge and prevent rotative movement of the panel in either direction relative to said support; and a manually operable member movable relatively to the panel between two limits, said member being connected positively at said limits with the panel to move therewith, said member being normally in a position intermediate the limits and engageable with one or the other of the locking members to hold the locking member out of locking position and release the panel for movement when the operable member is at one or the other of its limits respectively whereby the panel may be turned by a continuing movement of the said member after it has been initially moved to unlock same.

9. As a new article of manufacture, an anti-glare shield for vehicles having a flat light-modifying panel and a shaft rigidly fastened thereto along one edge to carry same; means, including a pair of bearing brackets, for mounting the shaft for turning movement inside a vehicle adjacent the windshield, one of said brackets having concentric with the shaft a cylindrical flange the inner surface of which forms an annular race; a disk rigidly fastened to the shaft inside of the race, having oppositely directed camming surfaces; locking rollers, one for each camming surface and the adjacent surface of the race; helical coil spring located between the rollers to yieldably urge same apart to wedge against their respective camming surfaces for locking the disk and shaft against rotative movement in either direction; a lever mounted for turning on the axis of the shaft, extending along one edge of the panel substantially in the same plane therewith, said lever having a plurality of lugs, one engaging each roller so that when the lever is turned relatively to the shaft and out of the plane of the panel the lugs on said lever engage one or the other of the locking rollers according to the direction of movement of the lever to a releasing position to permit turning of the shaft and panel in the same direction; a pair of stops carried by the panel and extending one on each side of the lever to selectively be engaged by the same after the shaft has been unlocked whereby continued movement of the lever will move the panel with it to a new position; resilient means between the stops and the lever to move the latter when it is manually released into alignment with the panel so that same is locked in its new position by the said rollers; and a handle fastened to the lever for operating the shield.

10. The invention as defined in claim 6 in which the means for locking the panel includes at least one movable locking part and means for yieldably holding same in locking position, said latter means also serving to hold the manually operable member in its intermediate position.

11. The invention as defined in claim 7 in which the means restricting accidental movement of the panel is located at the axis thereof, and in which the manually operable member is a lever, extending from said axis to the edge of the panel furthest removed from same, and having a flat fingerpiece adjacent said edge and lying substantially in the plane of the panel whereby movement of the latter may be accomplished by grasping both panel and fingerpiece and moving the fingerpiece first slightly to unlock the panel.

12. The invention as defined in claim 6 in which the means restricting accidental movement of the panel is located at the axis thereof, in which the manually operable member is a lever extending from said axis to the edge of the panel furthest removed from same and adapted to be grasped by an operator's fingers adjacent said edge whereby movement of the panel may be accomplished with comparatively light pressure, and in which the positive connection between the panel and the lever comprises a lug carried by one of said parts and engaging the other adjacent to the point where the lever is adapted to be grasped by the fingers.

13. The invention as defined in claim 6 in which there is a bracket adapted to be fastened to a vehicle, the bracket supporting a pivot connected to the panel for mounting the panel for movement about an axis, and in which the locking means prevents relative movement between said bracket and pivot connected to the panel.

14. An anti-glare shield for vehicles having a panel mounted for movement rotatively about an axis; a manually operable member movable relatively to the panel between locking and unlocking positions and connecting positively in the unlocking position with the panel to move therewith; means restricting accidental movement of the panel about its axis when the operable member is in the locking position, the manually operable member acting upon the said means to release the panel upon movement of said member to the unlocking position; and means for yieldably holding the operable member in the locking position whereby the panel is restricted in its accidental movement and whereby it may be freed and then turned by first moving the member to the unlocking position, the panel being automatically again restricted in movement in its new position upon release by the operator of the operable member and return of same to its locking position by said yielding means.

15. The invention as defined in claim 14 in which the panel is of comparatively light weight material and has a comparatively small amount of inertia, and in which the manually operable member has a fingerpiece located adjacent the axis of the panel whereby the later may be swung with only little pressure and movement on the part of the fingerpiece.

16. The invention as defined in claim 6 in which the means restricting accidental movement of the panel is located at the axis thereof, and in which the manually operable member is a lever extending from said axis to the edge of the panel furthest removed from same and adapted to be grasped by an operator's fingers adjacent said edge whereby movement of the panel may be accomplished with comparatively light pressure.

17. The invention as defined in claim 6 in which the means restricting accidental movement of the panel is located at the axis thereof, and in which the manually operable member is a lever extending from said axis to the edge of the panel furthest removed from same and adapted to be grasped by an operator's fingers adjacent said edge and in which the means for yieldably holding the operable member in its first predetermined position includes spring means carried by the panel adjacent said furthest removed edge and engaging the lever at a point removed from said axis to offset the effect of the lever's movement of inertia.

18. An anti-glare shield for vehicles having a panel and means for mounting same for movement rotatively about an axis, one of said parts having a track and the other having a camming surface located along the face of the track and spaced therefrom; a locking member located between the camming surface and the track; means including a spring for yieldably holding the locking member into engagement with the camming surface and the track so that it wedges and prevents movement of the panel in one direction; a manually operable member movable relatively to the panel between two predetermined positions, engaging the panel positively at one of said positions to move therewith, and being normally yieldably held in its other predetermined position, said member having a lug extending adjacent the track and adapted to hold the locking member out of wedging position only when the operable member is in position connecting positively with the panel whereby the latter is normally locked against turning in one direction and whereby it may be moved in said direction when the operable member has been shifted to positively engage it; and a fingerpiece connected with the operable member and located to lie substantially in the plane of the panel when the member is in its yieldably held position so that both fingerpiece and panel may be engaged by an operator's fingers simultaneously when the panel is being adjusted.

19. The invention as defined in claim 14 in which the means restricting accidental rotative movement of the panel prevents its turning in one direction only, and in which the operable member moves in such direction when it approaches its unlocking position whereby continued movement of the member will cause the panel to follow same.

LOUIS SPRARAGEN.